(12) United States Patent
Aoki et al.

(10) Patent No.: US 8,300,954 B2
(45) Date of Patent: Oct. 30, 2012

(54) INFORMATION PROCESSING APPARATUS AND METHOD, AND PROGRAM

(75) Inventors: Yuya Aoki, Tokyo (JP); Takuo Morimura, Kanagawa (JP); Shinobu Yamada, Tokyo (JP); Hirosuke Nagano, Kanagawa (JP); Kentaro Fukazawa, Kanagawa (JP); Hideki Mori, Tokyo (JP); Yasuhiko Suga, Kanagawa (JP); Shunsuke Harasaki, Tokyo (JP); Seiichi Inomata, Tokyo (JP); Tetsujiro Kondo, Tokyo (JP)

(73) Assignee: Sony Corporation (JP)

( * ) Notice: Subject to any disclaimer, the term of this patent is extended or adjusted under 35 U.S.C. 154(b) by 834 days.

(21) Appl. No.: 12/383,809

(22) Filed: Mar. 27, 2009

(65) Prior Publication Data

US 2009/0257661 A1    Oct. 15, 2009

(30) Foreign Application Priority Data

Mar. 28, 2008    (JP) ................................ P2008-086142

(51) Int. Cl.
*G06K 9/62* (2006.01)
*G06K 9/46* (2006.01)

(52) U.S. Cl. ................... 382/224; 382/207; 382/159

(58) Field of Classification Search .................. 382/190, 382/207, 209, 224, 238, 276, 278, 159; 702/66, 702/67, 72; 345/440.1; 348/458
See application file for complete search history.

(56) References Cited

U.S. PATENT DOCUMENTS

| | | | | |
|---|---|---|---|---|
| 5,946,044 A | * | 8/1999 | Kondo et al. | 348/458 |
| 6,163,758 A | * | 12/2000 | Sullivan et al. | 702/66 |
| 6,980,212 B2 | * | 12/2005 | Letts | 345/440.1 |

FOREIGN PATENT DOCUMENTS

JP    2002-218413    8/2002

* cited by examiner

*Primary Examiner* — Kanjibhai Patel
(74) *Attorney, Agent, or Firm* — Lerner, David, Littenberg, Krumholz & Mentlik, LLP

(57) ABSTRACT

An information processing apparatus includes a first classification unit configured to set each of pixels forming a first image as a pixel of interest and classify the pixels of interest into one of a plurality of provided classes of a first type in accordance with a predetermined rule; a feature amount generation unit configured to generate a shifted waveform whose phase is shifted with respect to a waveform of the first image containing the pixels of interest and configured to generate a feature amount; a second classification unit configured to be provided with a plurality of classes of a second type in accordance with the feature amount for each of the plurality of classes of the first type and configured to classify the pixels of interest; and a prediction calculation unit configured to predictively calculate pixels forming a second image.

14 Claims, 15 Drawing Sheets

FIG. 11

| IMAGE NUMBER | NOT HAVING FEATURE AMOUNT | HAVING FEATURE AMOUNT |
|---|---|---|
| 0 | 29.6571 | 29.83584 |
| 1 | 32.87458 | 33.09155 |
| 2 | 29.44815 | 29.73233 |
| 3 | 31.71542 | 31.85566 |
| 4 | 32.87979 | 33.20227 |
| 5 | 27.40501 | 27.65124 |
| 6 | 30.27119 | 30.81248 |
| 7 | 29.36451 | 29.5157 |
| 8 | 31.56327 | 32.05025 |
| 9 | 35.90351 | 36.31995 |

INFORMATION PROCESSING APPARATUS AND METHOD, AND PROGRAM

CROSS REFERENCES TO RELATED APPLICATIONS

The present application claims priority from Japanese Patent Application No. JP 2008-086142, filed in the Japanese Patent Office on Mar. 28, 2008, the entire content of which is incorporated herein by reference.

BACKGROUND OF THE INVENTION

1. Field of the Invention

The present invention relates to an information processing apparatus and method, and a program. More particularly, the present invention relates to an information processing apparatus which is capable of generating an image signal (with a sharply rising signal edge) at a resolution higher than in the related art at the time of high density (zoom) conversion and in which ringing is reduced, a method for use therewith, and a program for use therewith.

2. Description of the Related Art

Hitherto, there have been demands for converting an image of a standard resolution or a low resolution (hereinafter, referred to as an SD image as appropriate) into an image of a high resolution (hereinafter referred to as an HD image as appropriate) or for expanding such an image. In order to respond to such demands, hitherto, pixel values of missing pixels have been interpolated (compensated for) using so-called interpolation filters.

However, even if pixels are interpolated using interpolation filters, it is difficult to restore components that are not contained in an SD image, that is, components (high frequency components) of an HD image, presenting a problem that it is difficult to obtain an image of a high resolution.

Accordingly, in order to solve such problems, the present applicant of the present invention previously proposed a classification adaptive process (see, for example, Japanese Unexamined Patent Application Publication No. 2002-218413). A classification adaptive process is signal processing in which, by computing a linear primary expression (prediction computation expression) between pixel values of a plurality of pixels in a predetermined area of an input image and a group of coefficients that have been determined in advance by learning using a teacher image and a student image, an output image of high resolution is determined.

That is, if a classification adaptive process is applied to the above-described demands, linear association between an SD image and predetermined prediction coefficients implements an adaptive process for determining prediction values of pixels of an HD image. Such an adaptive process will be described further.

For example, it is now considered that prediction values E[y] of pixel values y of pixels forming an HD image (hereinafter referred to as HD pixels as appropriate) are determined as follows. That is, the following case will be considered. A prediction value E[y] is determined by using a linear primary association model that is defined by linear association between pixel values (hereinafter referred to as learning data as appropriate) $x_1, x_2, \ldots$ of several SD pixels (pixels forming an SD image with respect to an HD pixel will be referred to in this manner as appropriate), and predetermined prediction coefficients $w_1, w_2, \ldots$.

In this case, the prediction value E[y] can be represented as in the following Expression (1).

$$E[y] = w_1 x_1 + w_2 x_2 + \ldots \quad (1)$$

Therefore, in order to generalize Expression (1), a matrix X formed of a set of learning data is defined as in the following Expression (2). A matrix W formed of a set of prediction coefficients w is defined as in the following Expression (3). A matrix Y' formed of a set of prediction values E[y] is defined as in the following Expression (4).

$$X = \begin{bmatrix} X_{11} & X_{12} & \ldots & X_{1n} \\ X_{21} & X_{22} & \ldots & X_{2n} \\ \ldots & \ldots & \ldots & \ldots \\ X_{m1} & X_{m2} & \ldots & X_{mn} \end{bmatrix} \quad (2)$$

$$W = \begin{bmatrix} W_1 \\ W_2 \\ \ldots \\ W_n \end{bmatrix} \quad (3)$$

$$Y' = \begin{bmatrix} E(y_1) \\ E(y_2) \\ \ldots \\ E(y_m) \end{bmatrix} \quad (4)$$

As a result of being defined as described above, an observation Expression of the following Expression (5) holds.

$$XW = Y' \quad (5)$$

Prediction values E[y] close to pixel values y of HD pixels are determined by applying a least squares method to the observation Expression of Expression (5). In this case, a matrix Y formed of a set of true pixel values y of HD pixels serving as teacher data will be defined as in the following Expression (6). Furthermore, a matrix E formed of a set of remainders e of the prediction values E[y] with respect to the pixel values y of the HD pixels is defined as in the following Expression (7).

$$Y = \begin{bmatrix} y_1 \\ y_2 \\ \ldots \\ y_m \end{bmatrix} \quad (6)$$

$$E = \begin{bmatrix} e_1 \\ e_2 \\ \ldots \\ e_m \end{bmatrix} \quad (7)$$

In this case, a remainder expression of the following Expression (8) holds on the basis of Expression (5).

$$XW = Y + E \quad (8)$$

In this case, a prediction coefficient $w_i$ for determining prediction values E[y] close to the pixel values y of the HD pixels can be determined by, for example, minimizing the squared error shown by the following Expression (9).

$$\sum_{i=1}^{m} e_i^2 \quad (9)$$

Therefore, a case in which the squared error of Expression (9) is differentiated using a prediction coefficient $w_i$, that is, a prediction coefficient $w_i$ that satisfies the following Expression (10), will be an optimum value for determining the prediction values E[y] close to the pixel values y of the HD pixels.

$$e_1 \frac{\partial e_1}{\partial W_i} + e_2 \frac{\partial e_2}{\partial W_i} + \ldots + e_m \frac{\partial e_m}{\partial W_i} = 0 (i = 1, 2, \ldots, n) \quad (10)$$

Therefore, first, by differentiating Expression (8) using the prediction coefficient $w_i$, the following Expressions (11) holds.

$$\frac{\partial e_i}{\partial W_i} = x_{i1}, \frac{\partial e_i}{\partial W_i} = x_{i2}, \ldots, \frac{\partial e_i}{\partial W_i} = x_{in} (i = 1, 2, \ldots, m) \quad (11)$$

On the basis of Expressions (10) and (11), the following Expressions (12) is obtained.

$$\sum_{i=1}^{m} e_i x_{i1} = 0, \sum_{i=1}^{m} e_i x_{i2} = 0, \ldots, \sum_{i=1}^{m} e_i x_{in} = 0 \quad (12)$$

Furthermore, when the relationship among the learning data x, the prediction coefficient w, the teacher data y, and the remainder e in the remainder expression of Expression (8) is considered, the following normal Expressions (13) can be obtained on the basis of Expression (12).

$$(\Sigma_{i=1}^{m} x_{i1} x_{i1}) w_1 + (\Sigma_{i=1}^{m} x_{i1} x_{i2}) w_2 + \ldots + (\Sigma_{i=1}^{m} x_{i1} x_{in}) w_n = (\Sigma_{i=1}^{m} x_{i1} y_i)$$

$$(\Sigma_{i=1}^{m} x_{i2} x_{i1}) w_1 + (\Sigma_{i=1}^{m} x_{i2} x_{i2}) w_2 + \ldots + (\Sigma_{i=1}^{m} x_{i2} x_{in}) w_n = (\Sigma_{i=1}^{m} x_{i2} y_i)$$

$$\ldots$$

$$(\Sigma_{i=1}^{m} x_{in} x_{i1}) w_1 + (\Sigma_{i=1}^{m} x_{in} x_{i2}) w_2 + \ldots + (\Sigma_{i=1}^{m} x_{in} x_{in}) w_n = (\Sigma_{i=1}^{m} x_{in} y_i) \quad \text{i. (13)}$$

It is possible to formulate the normal expressions of Expressions (13), the number of Expressions being equal to the number of prediction coefficients w to be determined. As a consequence, it is possible to determine an optimum prediction coefficient w by solving Expressions (13). However, to solve Expressions (13), in Expressions (13), it is necessary that the matrix formed of coefficients applied to the prediction coefficient w be regular. When Expressions (13) are to be solved, for example, a sweeping-out method (a Gauss-Jordan's elimination method) or the like can be applied.

An adaptive process is such that, in the manner described above, the optimum prediction coefficient w is determined in advance, and the prediction values E[y] close to the pixel values y of the HD pixels are determined in accordance with Expression (1) by using the prediction coefficient w.

The adaptive process differs from an interpolation process in that components that are not contained in the SD image, that is, components contained in the HD image, are reproduced. That is, the adaptive process is viewed to be the same as an interpolation process using a so-called interpolation filter as long as only Expression (1) is viewed. However, since the prediction coefficient w corresponding to the tap coefficient of the interpolation filter is determined by learning using teacher data y, the components contained in the HD image can be reproduced. That is, an image having a high resolution can easily be obtained. On the basis of the above, the adaptive process may be said to be a process having a function of creating (the resolution) of the image.

SUMMARY OF THE INVENTION

However, in the adaptive process of the related art, problems occur, for example, the sense that there is insufficient resolution or the occurrence of ringing at the time of conversion into a high density (zoom).

It is desirable to be capable of generating an image signal (with a sharply rising signal edge) at a resolution higher than in the related art at the time of high density (zoom) conversion, in which ringing is reduced.

According to an embodiment of the present invention, there is provided an information processing apparatus including first classification means for setting each of pixels forming a first image as a pixel of interest and classifying the pixels of interest into one of a plurality of provided classes of a first type in accordance with a predetermined rule; feature amount generation means for generating a shifted waveform whose phase is shifted with respect to a waveform of the first image containing the pixels of interest and for generating a feature amount based on the shifted waveform for each of the plurality of classes of the first type; second classification means for classifying, on the basis of the feature amount generated by the feature amount generation means, the pixels of interest on which the classification of the first type has been performed into one of a plurality of provided classes of a second type in accordance with the feature amount for each of the plurality of classes of the first type; and prediction calculation means for predictively calculating pixels forming a second image by using a group of coefficients specified by each class of the pixels of interest of the first type and the second type and a group of data pixels including the pixels of interest.

The information processing apparatus may further include reference waveform generation means for generating a reference waveform for each of the plurality of classes of the first type, wherein the feature amount generation means may generate the feature amount on the basis of a correlation between the reference waveform and the shifted waveform.

The waveform generation means may determine an inflection point of the waveform of the first image containing the pixels of interest and may generate, as the reference waveform, a waveform whose inflection point is located at a specific place.

The classes of the first type may be classes that are classified using adaptive dynamic range coding.

A first information processing method and a first program according to embodiments of the present invention are an information processing method and a program that accord with the above-described first information processing apparatus according to the embodiment of the present invention.

In the first information processing apparatus, method, and program according to embodiments of the present invention, a plurality of classes of a first type are provided in accordance with a predetermined rule. Each of the pixels forming a first image is set as a pixel of interest and the pixels of interest are classified into one of the plurality of classes of the first type in accordance with the predetermined rule. A shifted waveform whose phase is shifted with respect to a waveform of the first image containing the pixels of interest is generated, and a feature amount based on the shifted waveform is generated for each of the plurality of classes of the first type. A plurality of classes of a second type are provided in accordance with the feature amount for each of the plurality of classes of the first type, and the pixels of interest on which the classification of the first type has been performed are classified into one of the plurality of classes of the second type on the basis of the feature amount. The pixels forming a second image are predictively calculated by using a group of coefficients specified by each class of the pixels of interest of the first type and the second type and a group of data pixels including the pixels of interest.

According to another embodiment of the present invention, there is provided an information processing apparatus including: student generation means for receiving a first image as a teacher and generating a second image as a student from the first image; first classification means for setting each of pixels forming the second image as a pixel of interest and classifying the pixels of interest into one of a plurality of provided classes of a first type in accordance with a predetermined rule; feature amount generation means for generating a shifted waveform whose phase is shifted with respect to a waveform of the second image containing the pixels of interest and for generating a feature amount based on the shifted waveform for each of the plurality of classes of the first type; second classification means for classifying, on the basis of the feature amount generated by the feature amount generation means, the pixels of interest on which the classification of the first type has been performed into one of a plurality of provided classes of a second type in accordance with the feature amount for each of the plurality of classes of the first type; and coefficient generation means for generating a group of coefficients used to predictively calculate pixels forming the first image from a group of data pixels including the pixels of interest for each of the classes of a type specified from the first type and the second type.

The information processing apparatus may further include reference waveform generation means for generating a reference waveform for each of the plurality of classes of the first type, wherein the feature amount generation means may generate the feature amount on the basis of a correlation between the reference waveform and the shifted waveform.

The waveform generation means may determine an inflection point of the waveform of the first image containing the pixels of interest and may generate, as the reference waveform, a waveform whose inflection point is located at a specific place.

The classes of the first type may be classed that are classified using adaptive dynamic range coding.

A second information processing method and a second program according to embodiments of the present invention are an information processing method and a program that accord with the above-described second information processing apparatus according to the embodiment of the present invention.

In the second information processing apparatus, method, and program according to embodiments of the present invention, a first image is received as a teacher and a second image is generated as a student from the first image. A plurality of classes of a first type are provided in accordance with a predetermined rule. Each of the pixels forming the second image is set as a pixel of interest and the pixels of interest are classified into one of the plurality of classes of the first type in accordance with the predetermined rule. A shifted waveform whose phase is shifted with respect to a waveform of the second image containing the pixels of interest is generated, and a feature amount based on the shifted waveform is generated for each of the plurality of classes of the first type. A plurality of classes of a second type in accordance with the feature amount are provided for each of the plurality of classes of the first type, and the pixels of interest on which the classification of the first type has been performed are classified into one of the plurality of classes of the second type on the basis of the feature amount. A group of coefficients used to predictively calculate pixels forming the first image is generated from a group of data pixels including the pixels of interest for each of the classes of a type specified from the first type and the second type.

As described above, according to the embodiments of the present invention, it is possible to generate an image signal (with a sharply rising signal edge) at a resolution higher than in the related art at the time of high density (zoom) conversion, in which ringing is reduced.

BRIEF DESCRIPTION OF THE DRAWINGS

FIG. 11 shows a list as a result of a quantitative evaluation;

DESCRIPTION OF THE PREFERRED EMBODIMENTS

Figure 1:
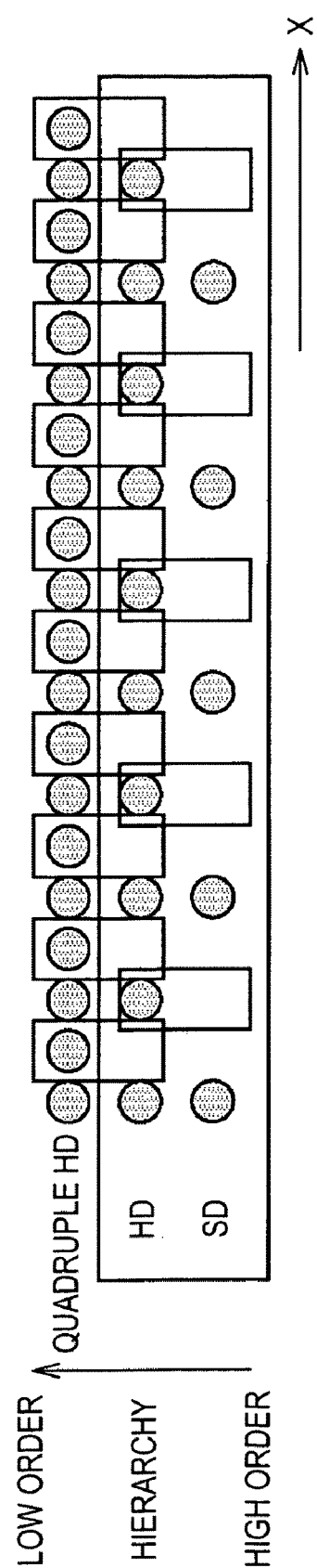
FIG. 1 shows the concept of a technique for determining an inflection point among techniques according to an embodiment of the present invention.

First, in order to facilitate the understanding of an embodiment of the present invention, the outline of a technique to which the present invention in the present embodiment is applied (hereinafter referred to as the technique of the embodiment of the present invention) will be described.

As described in the section of the Summary of the Invention, problems of the related art, for example, the sense that there is insufficient resolution and the occurrence of ringing, exist. In order to solve those problems, by using the following feature amount lower than or equal to a pixel accuracy for classification, waveform patterns that have not been able to be classified until now can be appropriately classified. As a result, since more similar waveform patterns can be collected, the performance of the classification adaptive process is improved.

First, the feature amount lower than or equal to a pixel accuracy will be described.

In the technology of the related art, classification is performed using input pixel data. This means that a feature amount at the pixel accuracy has been used.

In comparison, in the technique according to an embodiment of the present invention, classification using information more minute than a pixel accuracy, that is, information lower than or equal to the pixel accuracy, is performed.

More specifically, in the technology of the related art, classification is performed using ADRC (Adaptive Dynamic Range Coding) or the like. That is, in the technology of the related art, arbitrary data is obtained from an image, and adaptive quantization is performed in accordance with the dynamic range (the difference between the maximum value and the minimum value of the pixel value) for each item of the obtained data. In this technology of the related art, since classification is performed using input pixel data, the feature amount at the pixel accuracy is used.

In comparison, in the technique according to the embodiment of the present invention, the following first to third processes using the feature amount lower than or equal to the pixel accuracy are performed. That is, the first process is a process for shifting the phase of an input waveform by using a phase-shift filter. The second process is a process in which the degree to which the phase of the input waveform should be shifted to cause the correlation with a reference waveform to be high is determined by comparing the waveform after the phase has been shifted (hereinafter referred to as a phase-shifted input waveform) with the reference waveform. The third process is a process in which the amount of shift by a phase-shift filter is divided into several portions and these are used for classification. That is, this amount of shift is information lower than or equal to the pixel accuracy.

Furthermore, the technique according to an embodiment of the present invention will be described.

First, a reference waveform will be described.

As described above, in the second and third processes, a certain waveform is used as the reference waveform, the reference waveform is compared with a phase-shifted input waveform, and classification is performed on the basis of the result of the comparison.

As the reference waveform, for example, the following first to third waveforms can be adopted.

The first waveform refers to an average waveform for each class of 1-bit ADRC of an input waveform.

The second waveform refers to a waveform of a simple 1-bit ADRC code.

The third waveform refers to a waveform whose inflection point is located at a specific place when the inflection point is determined from the input waveform.

The first waveform, that is, "the average waveform for each class of 1-bit ADRC of the input waveform", denotes a waveform obtained as a result of obtaining an average of all the waveforms that are input for each class when the input waveform is subjected to classification by using 1-bit ADRC. The "average" referred to herein does not mean a so-called average, that is, an average such that samples are added and the result is divided using the number of samples. That is, the "average" referred to herein means the normalized average of waveforms such that waveforms are normalized, for example, from the value of 0 to the value of 1.

The second waveform, that is, "the waveform of simple 1-bit ADRC code", denotes, when the code of the class of 1-bit ADRC is, for example, "00111", the waveform of "00111".

The third waveform, that is, "the waveform in which an inflection point is determined from the input waveform and the inflection point is located at a specific place", means a waveform obtained by calculating an average of waveforms that are located in the middle, to which the inflection point comes, between which the class code of ADRC is switched (0 and 1) among the waveforms input for each class when the input waveform is subjected to classification by 1-bit ADRC. The meaning of "average" is the same as the "average" with regard to the first waveform.

In the present embodiment, as the reference waveform, the third waveform is adopted. That is, unless otherwise specified particularly, the reference waveform is assumed to mean the third waveform.

The technique of generating the reference waveform will be described below. The subject of the operation of processing described below is assumed to be an apparatus for the sake of description.

First, an inflection point is determined from an input waveform.

The technique itself of determining the inflection point is not particularly limited. However, in the present embodiment, it is assumed that the following technique is adopted. In that case, inflection points are determined with regard to two directions, that is, the vertical direction and the horizontal direction. However, here, for simplicity of description, a description specialized in the horizontal direction is given.

For example, in a case where a reference waveform of an SD size is to be created, by using a waveform of an HD size, a reference waveform of an SD size is created. For example, as shown in FIG. 1, a structure of changes in the screen size like SD, HD, and quadruple HD (the size of the density four times the screen size of HD) will hereinafter be referred to as a hierarchy structure. However, here, for the sake of convenience, data of SD is assumed to be data of the highest order hierarchy and data of quadruple HD is assumed to be data of the lowest order hierarchy.

In this case, since a reference waveform of an SD size is to be created, a secondary differentiated value is determined by using data of an HD size, which is one hierarchy lower, so that the place at which the secondary differentiated value becomes 0 is determined as an inflection point. The secondary differentiated value is assumed to be determined in accordance with the following Expression (14).

$$f''(x) = f(x-1) + f(x+1) - 2 \times f(x) \tag{14}$$

where f(x) is a pixel value in the x coordinate.

The above-described technique of determining an inflection point is adopted in the present embodiment.

Next, waveforms in which an inflection point exists during the time in which the ADRC code is switched are collected. Then, the waveform obtained as a result of calculating the average of the collected waveforms is generated as the reference waveform.

Here, the position of the inflection point between two places during the time in which the ADRC code is switched will be referred to as an inflection point position. In this case, if only the waveforms in which the inflection point position is 0.5 are collected and averaged, the reference waveform can be generated. However, there can be a case in which the number of waveforms whose inflection point position is 0.5 is too small for calculating an average. In such a case, by allowing for an error, waveforms are collected within the error range, and the waveform obtained as a result of calculating the average of the collected waveforms can be generated as the reference waveform.

Figure 2:
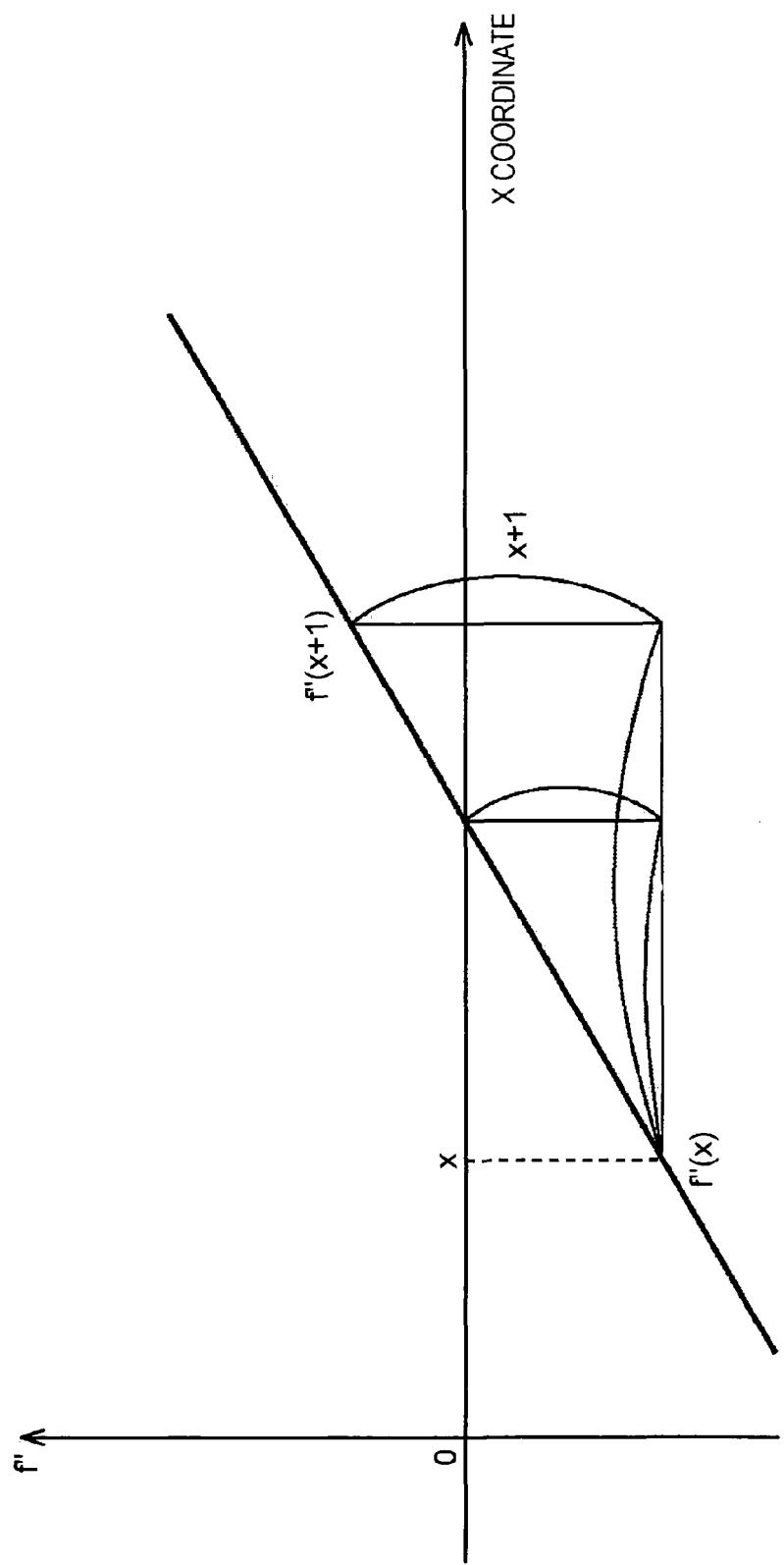
FIG. 2 shows the concept of a technique for determining an inflection point position among techniques according to an embodiment of the present invention.

The inflection point position can be computed in the following manner. That is, the x coordinates at two places during the time in which the ADRC code is switched are determined. The determined x coordinates at the two places are denoted as x and x+1. The secondary differentiated values at x and x+1 are denoted as f"(x) and f"(x+1). Then, the inflection point position to be determined is a position at which the oblique line as shown in FIG. 2 intersects the x coordinate. That is, the inflection point position is determined on the basis of the following Expression (15).

$$\text{Inflection point position}=abs(f''(x))/(abs(f''(x))+abs(f''(x+1))) \quad (15)$$

where abs(x) means a function of returning the absolute value of x.

Next, a description will be given of the flow of the entire processing implemented by the technique of the embodiment of the present invention.

Mainly, processing by the technique of the embodiment of the present invention is broadly classified into processing for generating prediction coefficients by learning by using classification (hereinafter referred to as a "learning process") and a mapping process. The mapping process refers to a process for obtaining an HD prediction image from an SD image by using the prediction coefficient obtained by a learning process.

The learning process and the mapping process will be described below in this order. Here, for the sake of description, a description will be given by assuming that the subject of the operation is an apparatus. In both the processes, the processing unit is assumed to be a pixel. That is, each pixel forming an image is sequentially set as a pixel of interest to be processed, and processing on the pixel of interest is repeated. However, for the sake of description, the description of the repeated processing will be omitted below as appropriate.

Figure 3:
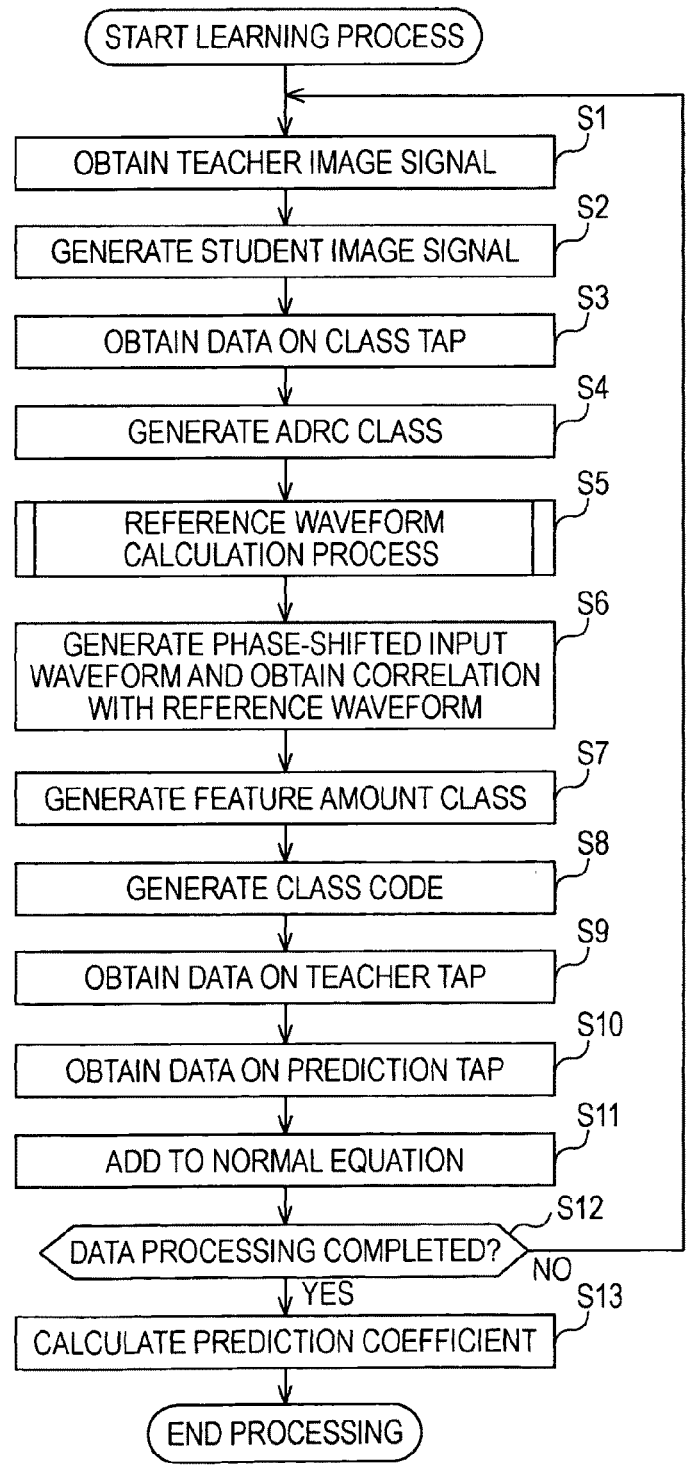
FIG. 3 is a flowchart illustrating an example of a learning process to which an embodiment of the present invention is applied.

FIG. 3 is a flowchart illustrating an example of a learning process to which an embodiment of the present invention is applied.

In step S1, a teacher image signal (HD signal) is obtained.

In step S2, a student image signal (SD signal) is generated. That is, by performing, for example, a down-conversion process using an LPF (Low-Pass Filter) on a teacher image signal (HD signal), a student image signal (SD signal) is generated.

Figure 4A:
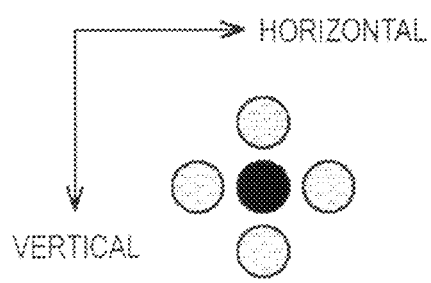
FIGS. 4A and 4B show examples of patterns of a prediction tap and a class tap.

In step S3, data on a class tap is obtained from the student image signal (SD signal). The data itself on the class tap is not particularly limited as long as it is data on which a classification adaptive process can be performed. For example, in the present embodiment, as shown in FIG. 4A, data constituting pixels (pixels indicated using gray circle marks) above, below, to the left of, and to the right of the pixel of interest (pixel indicated using a black circle mark) at the center is obtained as a class tap.

In step S4, an ADRC class is generated by performing a 1-bit ADRC process by using the class tap. That is, the pixels of the student image corresponding to the student image signal (SD signal) are classified into an ADRC class.

In step S5, a reference waveform is generated for each ADRC class. The reference waveform generation technique is as described above. The process of step S5, in conjunction with the description of FIG. 3, will be referred to as a reference waveform generation process. The exemplary details of the reference waveform generation process will be described later with reference to FIG. 6.

In step S6, a phase-shifted input waveform is generated, and a correlation with the reference waveform is obtained. In step S7, a feature amount class is generated. In step S8, a class code is generated.

Figure 5:
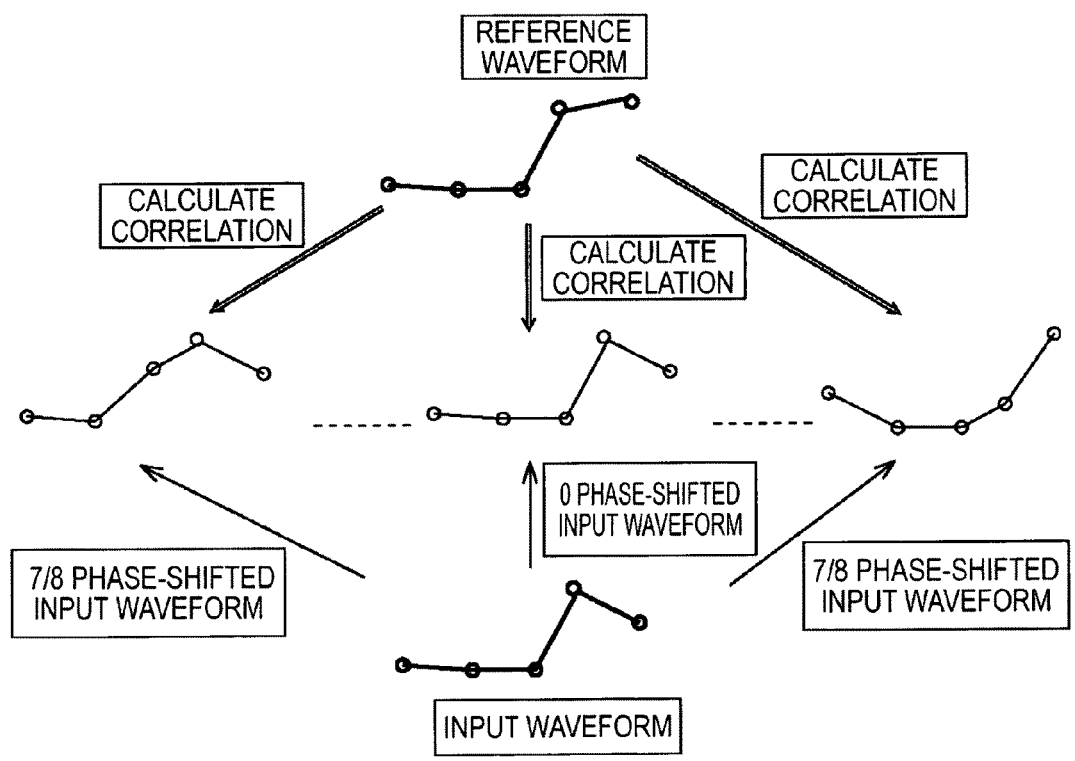
FIG. 5 illustrates the outline of a method of generating a phase input waveform and a method of generating a feature amount on the basis of a comparison with a reference waveform.

More specifically, as shown in FIG. 5, waveform data for the amount of horizontal N pixels of the student image, which corresponds to the student image signal (SD signal), is obtained as an input waveform. By using a phase-shift filter with respect to the input waveform, waveform data in which the phase is shifted by a −7/8 to 7/8 phase, that is, a −7/8 phase-shifted input waveform to a 7/8 phase-shifted input waveform are generated. N is an integer value determined by the number of items of the data used by the phase-shift filter. In the example of FIG. 5, the pixel of interest is contained in N pixels.

Then, as shown in FIG. 5, a correlation is determined by using data for five pixels of each of the −7/8 phase-shifted input waveform to the 7/8 phase-shifted input waveform, and the reference waveform determined for each ADRC class in advance. That is, since the −7/8 phase-shifted input waveform to the 7/8 phase-shifted input waveform are formed of 15 items of waveform data, those 15 correlation coefficients are determined.

Therefore, the phase-shifted input waveform having the maximum value among the 15 correlation coefficients is specified, and a feature amount class is generated on the basis of the shifted (offset) position of the specified phase-shifted input waveform.

Then, the entire class code is generated on the basis of the ADRC class and the feature amount class.

As described above, upon completing the processing of steps S6 to S8, the process proceeds to step S9.

In step S9, data on a teacher tap is obtained from the teacher image signal (HD signal).

Figure 4B:
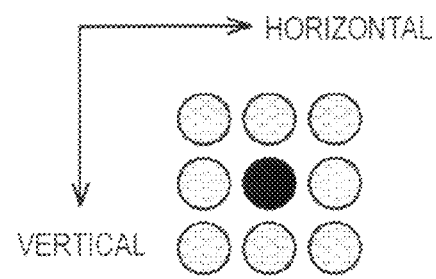

In step S10, data on a prediction tap is obtained from the student image signal (SD signal). For example, in the present embodiment, as shown in FIG. 4B, data formed of the pixel of interest (the pixel indicated using a black circle mark) and its surrounding 8 pixels (pixels indicated using gray circle marks) is obtained as a prediction tap.

In step S11, each item of data on a teacher tap and a prediction tap is added in a normal expression for each class code.

In step S12, it is determined whether or not the processing for the data has been completed.

When data processing for all the samples has not yet been completed, it is determined to be NO in step S12, the process returns to step S1, and the subsequent processing is repeated.

Thereafter, the loop process of steps S1 to S12 is repeatedly performed. When addition for all the samples to the normal expression is performed, it is determined to be YES in the process of step S12. The process then proceeds to step S13.

In step S13, a prediction coefficient is calculated by solving the normal expression. The prediction coefficient is stored and used for a mapping process of FIG. 7 (to be described later).

Figure 6:
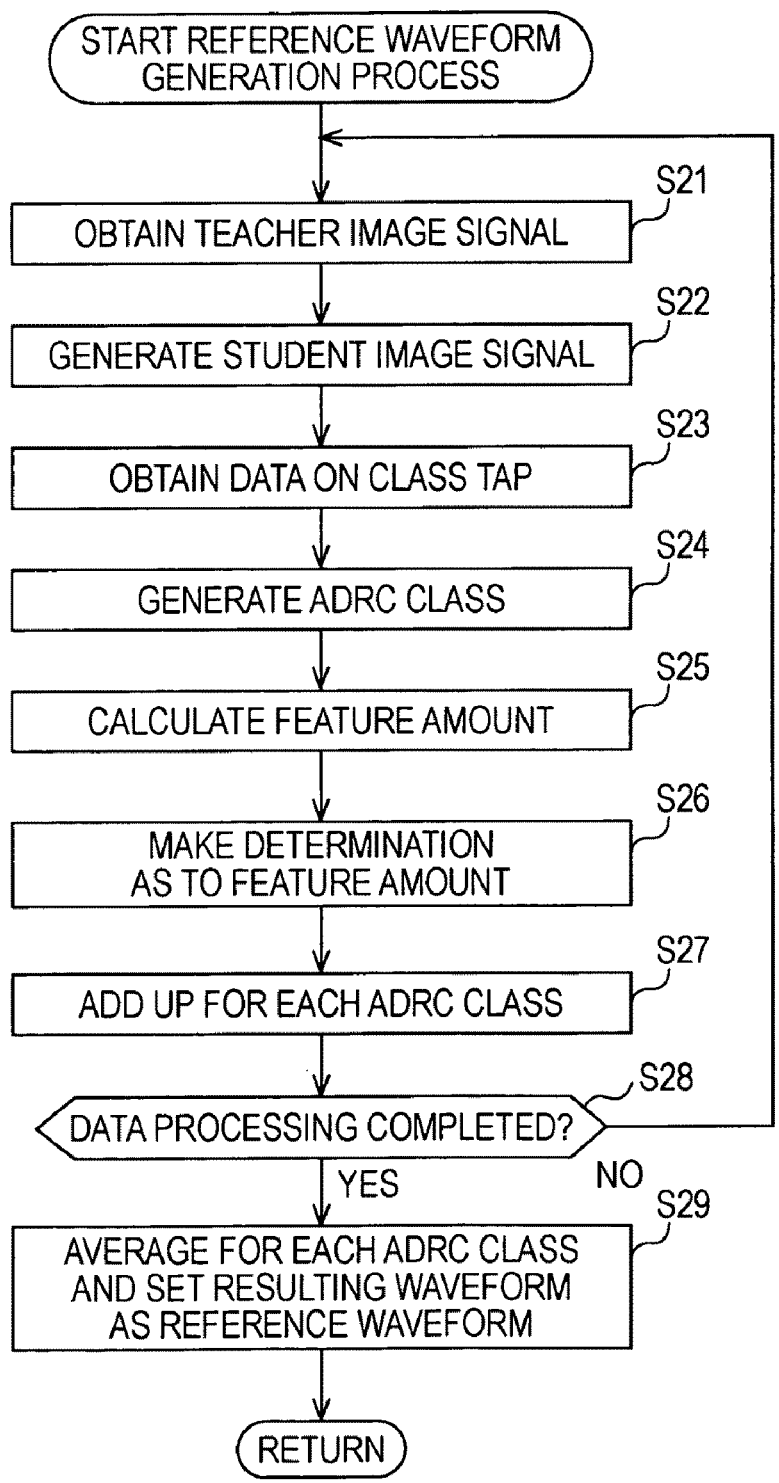
FIG. 6 is a flowchart illustrating an example of a reference waveform generation process within the learning process of FIG. 3.

FIG. 6 is a flowchart illustrating an example of the details of a reference waveform generation process in step S5 of the learning process of FIG. 3.

In step S21, a teacher image signal (HD signal) is obtained.

In step S22, a student image signal (SD signal) is generated. For example, by performing a down-conversion process using an LPF on the teacher image signal (HD signal), a student image signal (SD signal) is generated.

In step S23, data on a class tap is obtained from the student image signal (SD signal). The data itself of the class tap is not particularly limited as long as it is data on which a classification adaptive process can be performed. However, it is necessary for the classification adaptive process to accord with the learning process of FIG. 3. Therefore, for example, in the present embodiment, the data shown in FIG. 4A is obtained as a class tap.

In step S24, by performing a 1-bit ADRC process using a class tap, an ADRC class is generated. That is, each pixel of a student image corresponding to the student image signal (SD signal) is classified into an ADRC class.

In step S25, the feature amount is computed for each ADRC class. For example, in the above-described example, the inflection point position indicated by Expression (15) above is computed as a feature amount.

In step S26, a determination as to the feature amount is made for each ADRC class. In step S27, the waveform of the student image signal (SD signal) that has been determined to be the feature amount that should be added up is added up for each ADRC class. For example, in the above-described example, when the inflection point position is determined to be 0.5, the waveform will be added up.

In step S28, it is determined whether or not data processing has been completed.

When data processing for all the samples has not yet been completed, it is determined to be NO in step S28. The process then returns to step S21, and the subsequent processing is repeated.

Thereafter, the loop process of steps S21 to S28 is repeatedly performed. When waveforms are added up for each ADRC class for all the samples, it is determined to be YES in the process of step S28. The process then proceeds to step S29.

In step S29, the waveforms that have been added up in this manner are averaged for each ADRC class, and each waveform obtained as a result for each ADRC class is set as a reference waveform.

This completes the reference waveform generation process.

Figure 7:
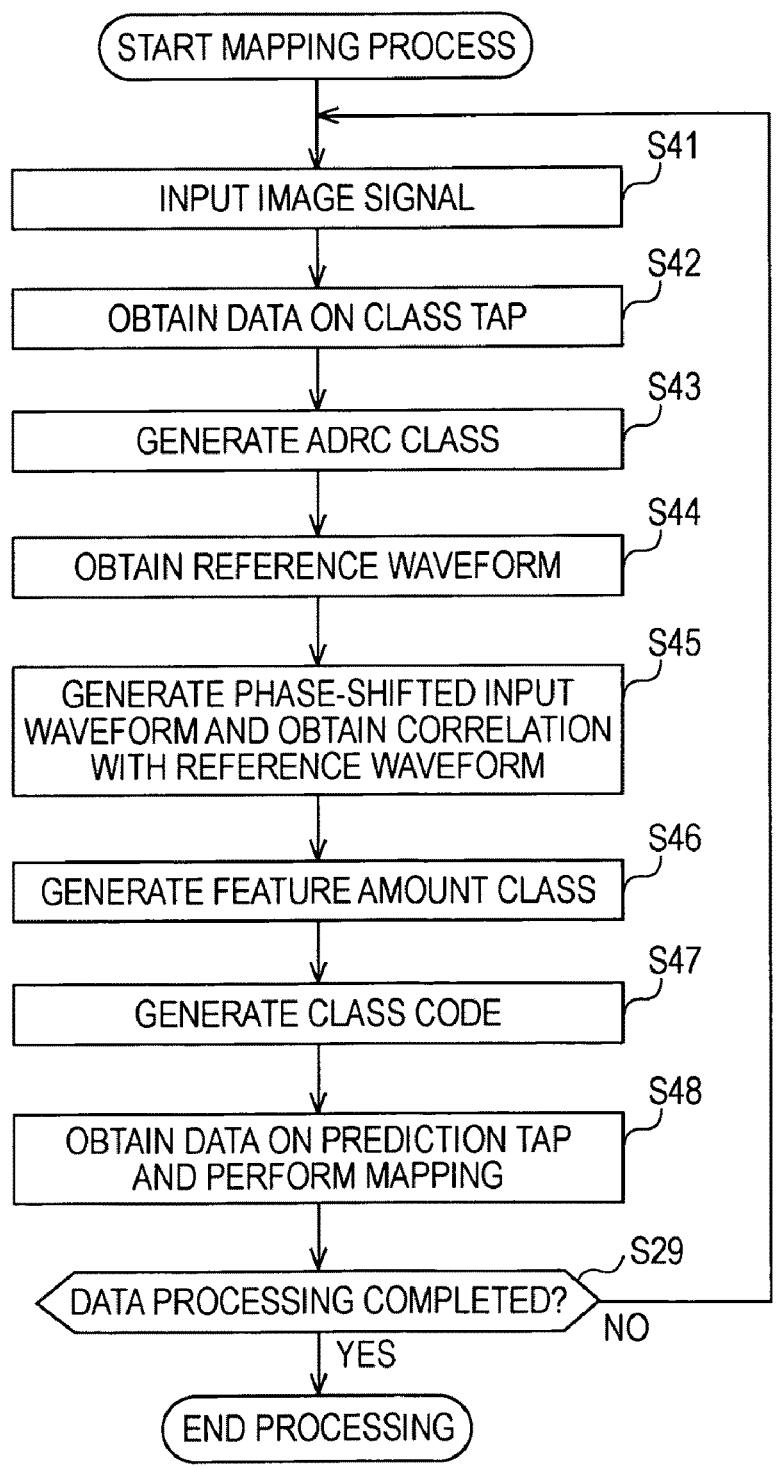
FIG. 7 is a flowchart illustrating an example of a mapping process to which an embodiment of the present invention is applied.

FIG. 7 is a flowchart illustrating an example of a mapping process to which an embodiment of the present invention is applied.

In step S41, an image signal (SD signal) is input.

In step S42, data on a class tap is obtained from the image signal (SD signal). The data itself on the class tap is not particularly limited as long as it is data on which a classification adaptive process can be performed. However, it is necessary for the classification adaptive process to accord with the learning process. Accordingly, for example, in the present embodiment, the above-described data shown in FIG. 4A is obtained as a class tap.

In step S43, by performing a 1-bit ADRC process using a class tap, an ADRC class is generated. That is, each pixel of the student image corresponding to the student image signal (SD signal) is classified into an ADRC class.

In step S44, a reference waveform is obtained for each ADRC class. The reference waveform has been generated in advance in the process of step S5 (processing in FIG. 6) of the learning process of FIG. 3.

In step S45, a phase-shifted input waveform is generated, and a correlation with the reference waveform is obtained. In step S46, a feature amount class is generated. In step S47, a class code is generated.

The processing of steps S45 to S47 is basically identical to the processing of steps S6 to S8 of the learning process of FIG. 3. Therefore, for the details of the processing of steps S45 to S47, the detailed description of the processing of steps S6 to S8 of the learning process of FIG. 3 should preferably be referred to.

In step S48, the data on a prediction tap is obtained from the image signal (SD signal) and is mapped.

For example, in the present embodiment, the data shown in FIG. 4B is obtained as a prediction tap.

The prediction coefficient computed by the process of step S13 of the learning process of FIG. 3 and each item of data on the prediction tap are substituted, for each class code, in the prediction computation expression of Expression (1), and computation is performed, thereby generating an HD prediction image signal (HD signal) from the image signal (SD signal).

In step S49, it is determined whether or not data processing has been completed.

When the processing for all the data forming the image signal has not been completed, it is determined to be NO in the process of step S49. The process then returns to step S41, and the subsequent processing is repeated.

Thereafter, the loop process of steps S41 to S49 is repeatedly performed. When the processing for all the data forming the image signal is completed, that is, HD prediction image signals (HD signals) corresponding to all the image signals (SD signals) are generated, it is determined to be YES in the process of step S49, and the mapping process is completed.

Here, referring to FIGS. 8 to 11, an image (hereinafter referred to as an "image having a feature amount") mapped by the technique of the embodiment of the present invention is compared with an image (hereinafter referred to as an "image not having a feature amount") mapped by the technique (only the ADRC classification) of the related art. The "image having a feature amount" means an image obtained as a result of the mapping process of FIG. 7. More specifically, the comparison is performed by using the result of the qualitative evaluation that evaluates a waveform and the result of the quantitative evaluation that evaluates SNR (Signal to Noise ratio).

Figure 8:
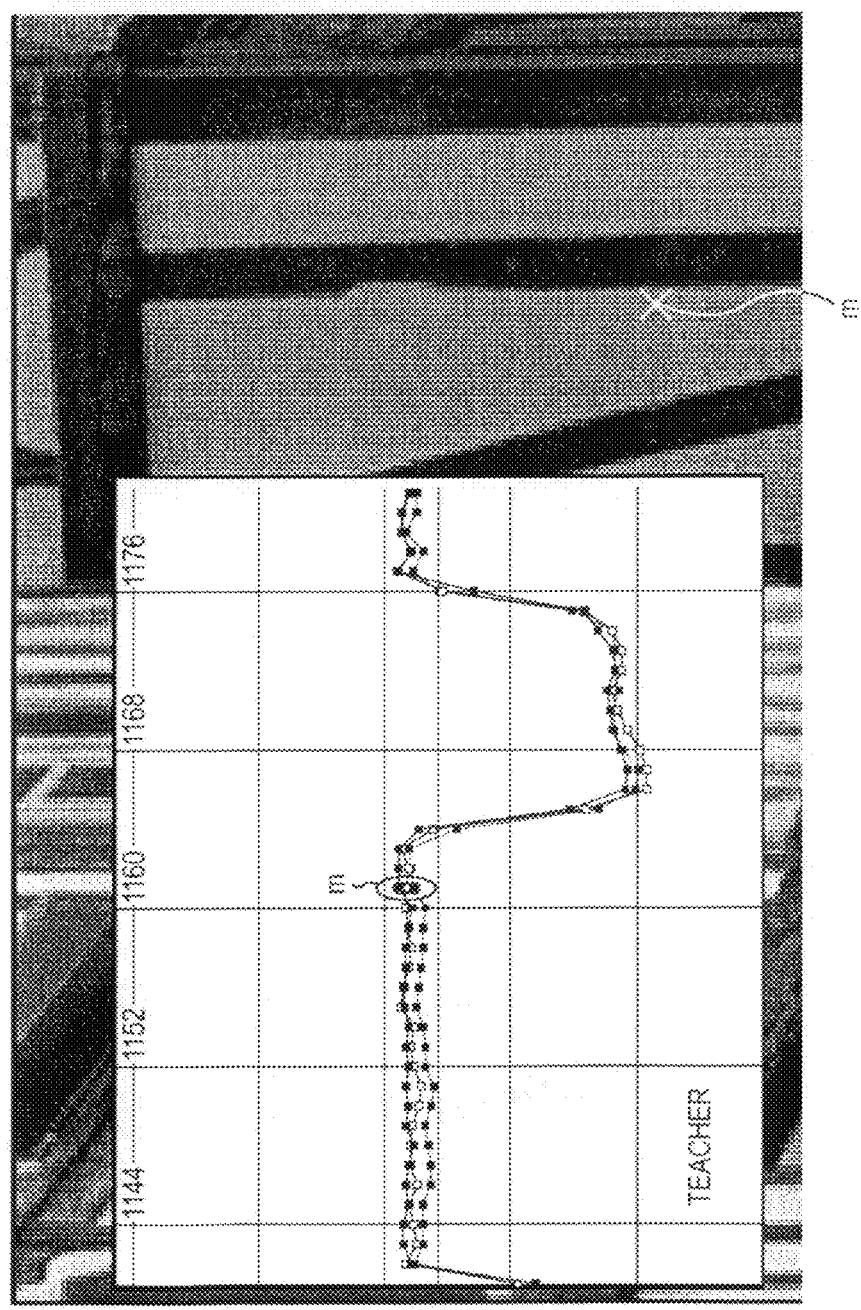
FIG. 8 shows a portion of a teacher image and the waveform thereof.
Figure 9:
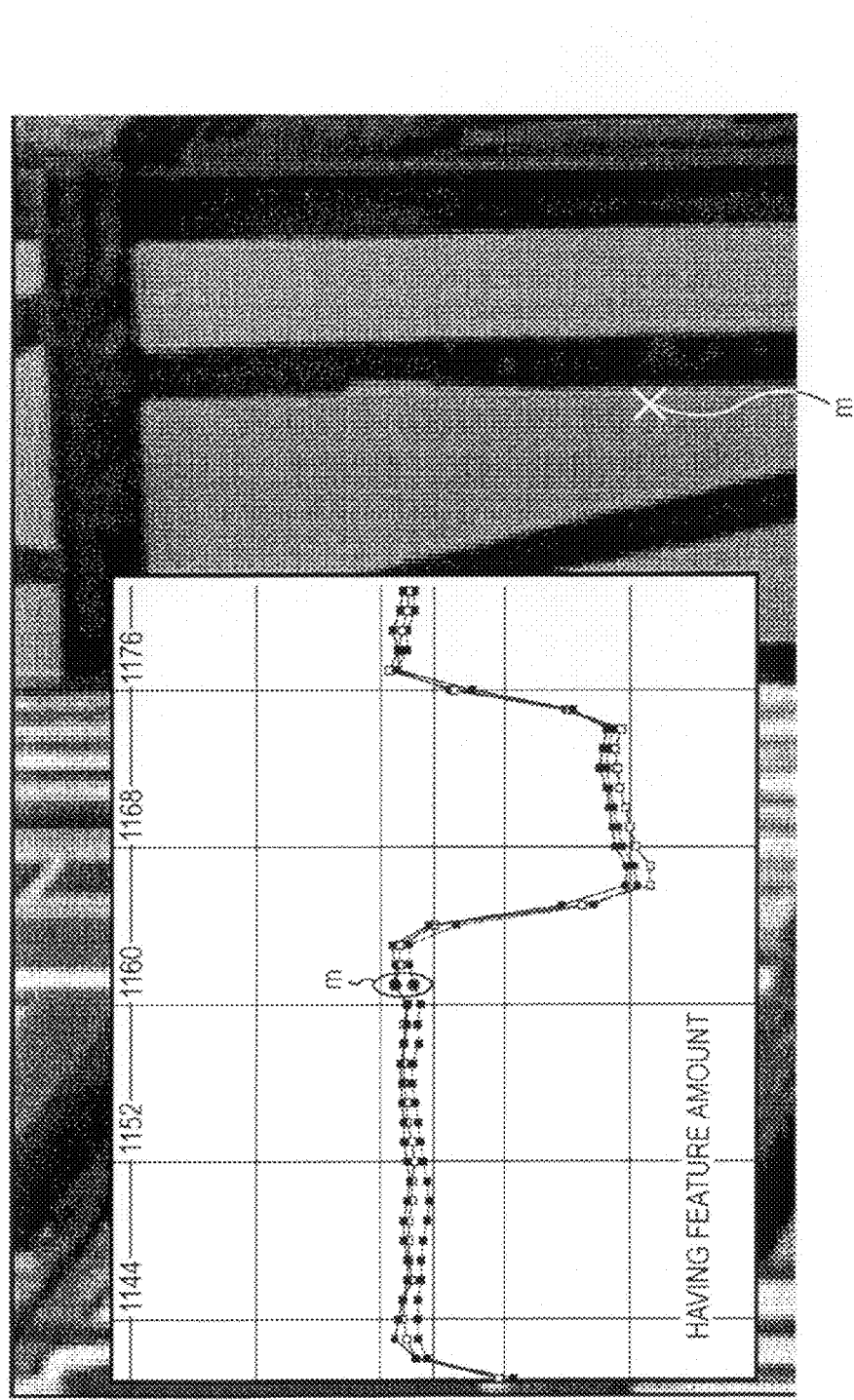
FIG. 9 shows an image obtained as a result of applying the technique of an embodiment of the present invention, that is, a portion of an image having a feature amount, and the waveform of each color image.
Figure 10:
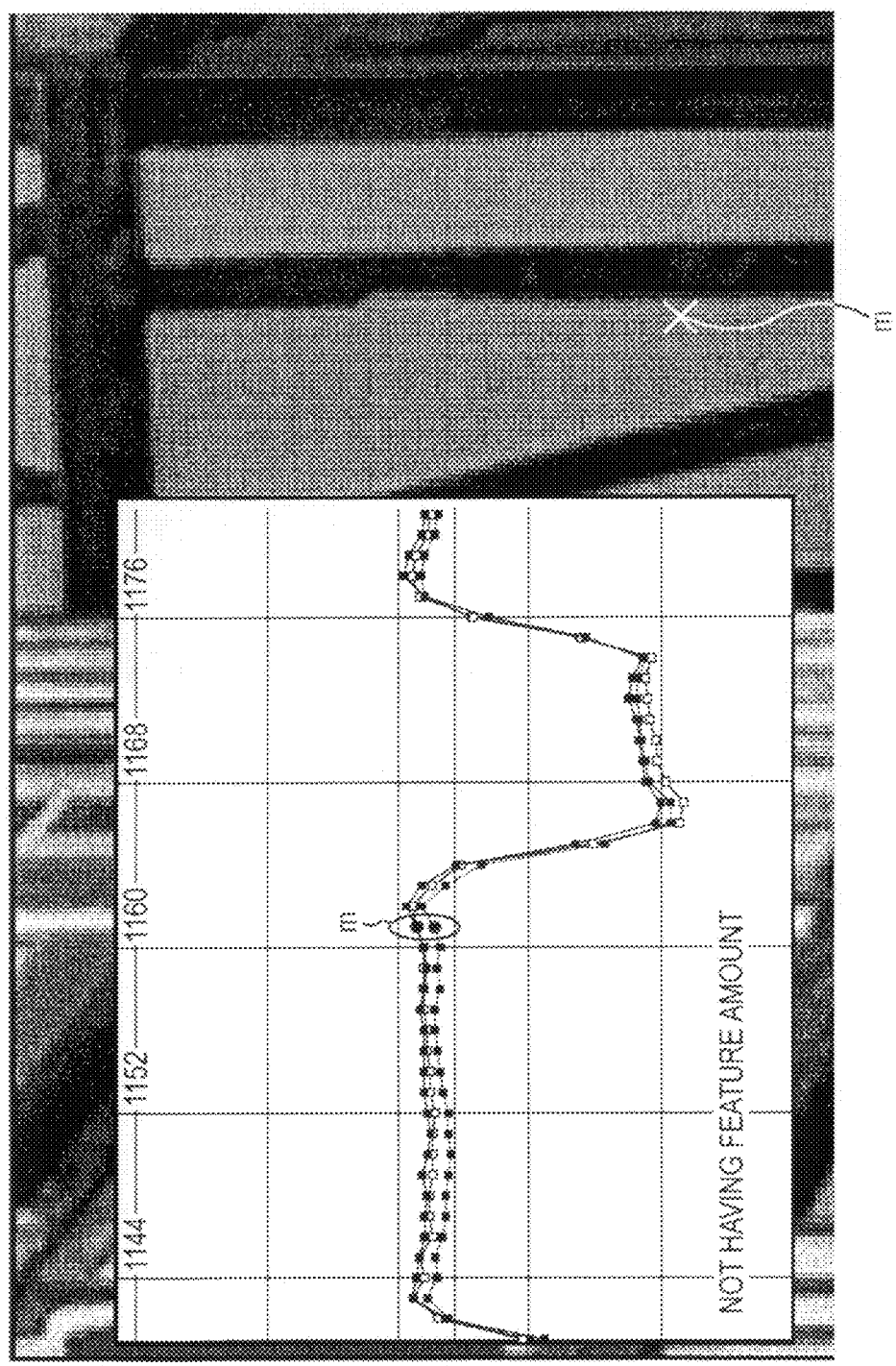
FIG. 10 shows an image obtained as a result of applying the technique of the related art, that is, a portion of an image not having a feature amount, and the waveform of each color image.

FIG. 8 shows a portion of a teacher image and the waveform thereof. FIG. 9 shows a portion of an image having a feature amount with respect to a teacher image, and the waveform of each color image thereof. FIG. 10 shows a portion of an image not having a feature amount with respect to a teacher image, and the waveform of each color image thereof.

The images of FIGS. 8 to 10 are primarily color images. The waveforms shown in the images are a waveform R, a waveform G, and a waveform B in the horizontal direction of each color image of RGB (Red-Green-Blue) in the line in which a pixel m of a crossed mark in the image exists. The vertical axis of the graph in which the waveforms are shown indicates a pixel value, and the horizontal axis indicates the pixel position in the horizontal direction.

When FIG. 9 is compared with FIG. 10, it can be seen that the waveform of the image having a feature amount of FIG. 9 is clearer than that of the image not having a feature amount of FIG. 10 in terms of qualitative properties. That is, it can be seen that the resolution feeling of the image having a feature amount of FIG. 9 has been improved more than the image not having a feature amount of FIG. 10. Furthermore, it can be seen that the ringing of the image having a feature amount of FIG. 9 has been decreased to less than that of the image not having a feature amount of FIG. 10.

Next, the results of the quantitative evaluation will be described with reference to FIG. 11. FIG. 11 shows a list of results of the quantitative evaluation.

In FIG. 11, in the first column of the list, the image number of a teacher image is shown. In the second column of the list, the SNR of an image not having a feature amount with respect to the teacher image of the first column is shown. In the third column of the list, the SNR of an image having a feature amount with respect to the teacher image of the first column is shown.

The results show that all of the SNR of the image having a feature amount are in a + direction (increase direction) in comparison with the SNR of the image not having a feature amount. This means that the SNR of the image having a feature amount has improved more than the SNR of the image not having a feature amount. Therefore, it can be seen that, by adding feature amount classification as in the technique of the embodiment of the present invention, marked effects can be obtained. Furthermore, the results are classification results in the case that the technique of the embodiment of the present invention is applied in only the horizontal direction. Therefore, by further performing classification with respect to the vertical direction, the effects become more conspicuous.

A description will be given below of an embodiment of an information processing apparatus to which the technique of the present invention is applied.

Figure 12:
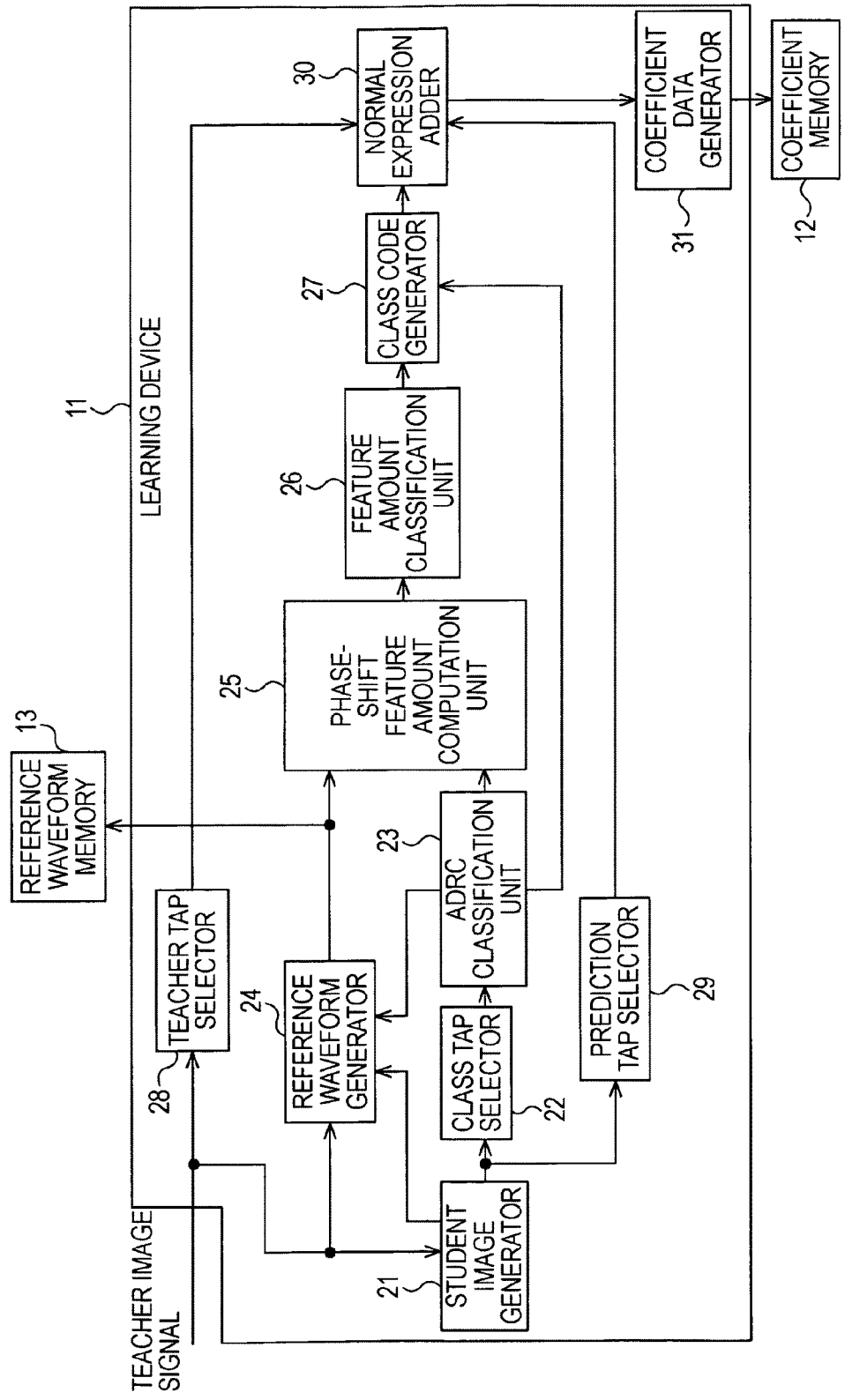
FIG. 12 is a block diagram showing an example of the functional configuration of a learning device according to an embodiment of an information processing apparatus to which the present invention is applied.

FIG. 12 is a function block diagram showing an example of the functional configuration of a learning device 11.

It is possible for the learning device 11 to perform the above-described learning process of FIG. 3.

The learning device 11 includes a student image generator 21, a class tap selector 22, an ADRC classification unit 23, a reference waveform generator 24, a phase-shift feature amount computation unit 25, a feature amount classification unit 26, a class code generator 27, a teacher tap selector 28, a prediction tap selector 29, a normal expression adder 30, and a coefficient data generator 31.

A teacher image signal (HD signal) is input to the learning device 11. More specifically, the teacher image signal (HD signal) is provided to the teacher tap selector 28, the student image generator 21, and the reference waveform generator 24. That is, the process of step S1 of FIG. 3 is performed.

The student image generator 21 generates a student image signal (SD signal) from the teacher image signal (HD signal), and provides the student image signal to the class tap selector 22, the reference waveform generator 24, and the prediction tap selector 29. That is, the student image generator 21 performs the process of step S2 of FIG. 3.

The class tap selector 22 selects a class tap from the student image signal (SD signal), and provides the class tap to the ADRC classification unit 23. That is, the class tap selector 22 performs the process of step S3 of FIG. 3.

The ADRC classification unit 23 generates an ADRC class by performing a 1-bit ADRC process by using the class tap from the class tap selector 22, and provides the ADRC class to the reference waveform generator 24, the phase-shift feature amount computation unit 25, and the class code generator 27. That is, the ADRC classification unit 23 performs the process of step S4.

The reference waveform generator 24 generates a reference waveform for each ADRC class, stores the reference waveform in the reference waveform memory 13, and also provides the reference waveform to the phase-shift feature amount computation unit 25. That is, the reference waveform generator 24 performs the process of step S5 of FIG. 3, that is, the reference waveform generation process of FIG. 6. A detailed example of the reference waveform generator 24 will be described later with reference to FIG. 13.

The phase-shift feature amount computation unit 25 generates a phase-shifted input waveform, obtains a correlation with the reference waveform, and provides the correlation, as the feature amount, to the feature amount classification unit 26. That is, as described above, as shown in, for example, FIG. 5, the phase-shift feature amount computation unit 25 determines a correlation by using data for five pixels of each of a −7/8 phase-shifted input waveform to a 7/8 phase-shifted input waveform and the reference waveform determined in advance for each ADRC class. That is, since the −7/8 phase-shifted input waveform to the 7/8 phase-shifted input waveform are composed of 15 items of waveform data, those 15 correlation coefficients are computed as the feature amount. As described above, the phase-shift feature amount computation unit 25 performs the process of step S6 of FIG. 3.

The feature amount classification unit 26 generates a feature amount class. More specifically, for example, in the case that the above-described 15 correlation coefficients are provided as the feature amount, the feature amount classification unit 26 specifies the phase-shifted input waveform having a maximum value among the 15 correlation coefficients, generates a feature amount class on the basis of the shifted (offset) position of the specified phase-shifted input waveform, and provides the feature amount class to the class code generator 27. That is, the feature amount classification unit 26 performs the process of step S7 of FIG. 3.

The class code generator 27 generates the entire class code on the basis of the ADRC class and the feature amount class, and provides the class code to the normal expression adder 30. That is, the class code generator 27 performs the process of step S8 of FIG. 3.

The teacher tap selector 28 selects the data on a teacher tap from the teacher image signal (HD signal), and provides it to the normal expression adder 30. That is, the teacher tap selector 28 performs the process of step S9 of FIG. 3.

The prediction tap selector 29 obtains the data on the prediction tap from the student image signal (SD signal), and provides the data to the normal expression adder 30. That is, the prediction tap selector 29 performs the process of step S10 of FIG. 3.

The normal expression adder 30 adds, for each class code, the data on the teacher tap and the data on the prediction tap to the normal expression. That is, the normal expression adder 30 performs the process of step S11 of FIG. 3. When the normal expression adder 30 performs addition for all the samples to the normal expression, the normal expression adder 30 provides the result to the coefficient data generator 31.

The coefficient data generator 31 computes the prediction coefficient by solving the normal expression, and stores the prediction coefficient in the coefficient memory 12. That is, the coefficient data generator 31 performs the process of step S13 of FIG. 3.

Figure 13:
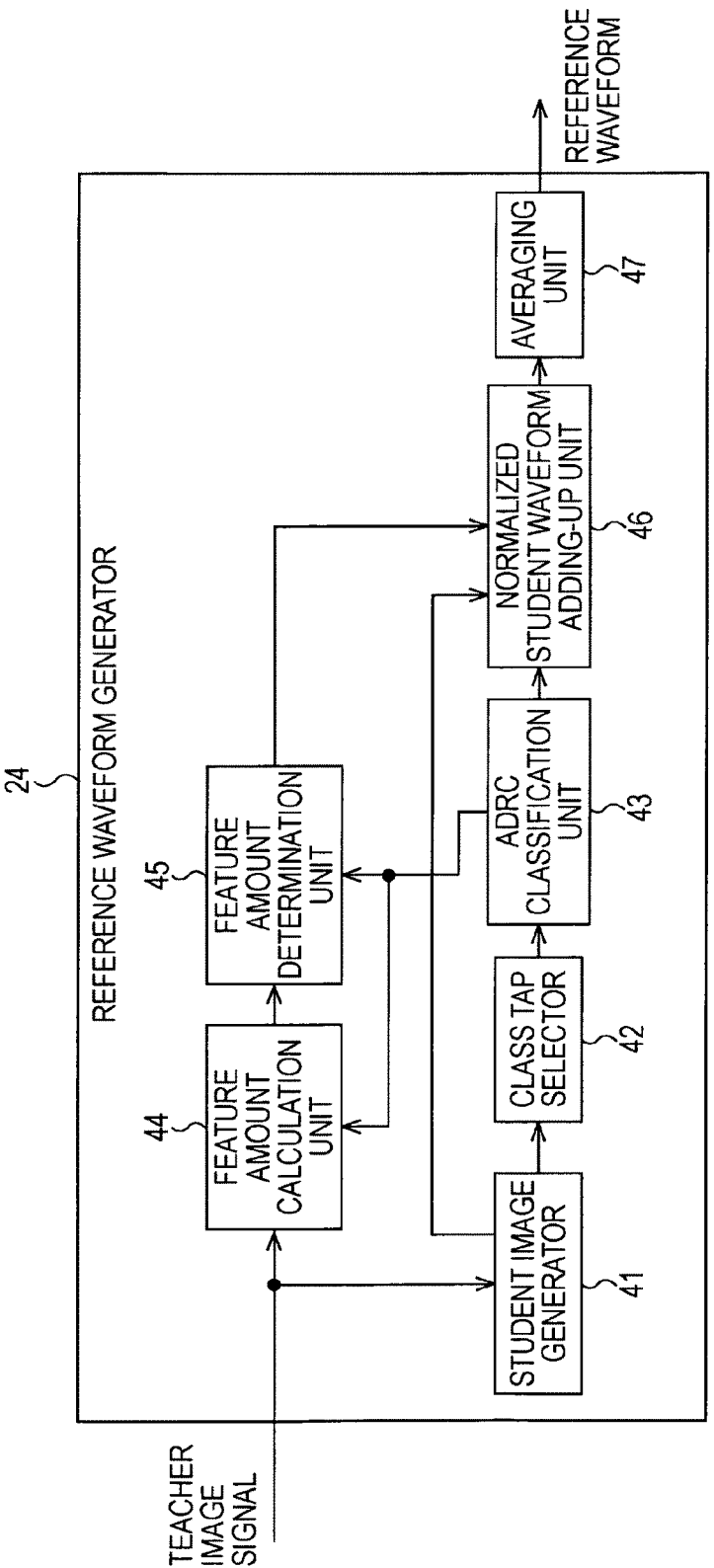
FIG. 13 is a block diagram showing an example of the functional configuration of a reference waveform generator within the learning device of FIG. 12.

FIG. 13 is a function block diagram showing a detailed example of the functional configuration of the reference waveform generator 24 within the learning device 11 of FIG. 12.

The reference waveform generator 24 includes a student image generator 41, a class tap selector 42, an ADRC classification unit 43, a feature amount computation unit 44, a feature amount determination unit 45, a normalized student waveform adding-up unit 46, and an averaging unit 47.

A teacher image signal (HD signal) is input to the student image generator 41 of the reference waveform generator 24.

The student image generator 41 generates a student image signal (SD signal) from the teacher image signal (HD signal), and provides the student image signal to the class tap selector 42 and the normalized student waveform adding-up unit 46. That is, the student image generator 41 performs the processes of steps S21 and S22 of FIG. 6.

The class tap selector 42 selects the data on the class tap from the student image signal (SD signal), and provides the data to the ADRC classification unit 43. That is, the class tap selector 42 performs the process of step S23 of FIG. 6.

The ADRC classification unit 43 generates an ADRC class by performing a 1-bit ADRC process by using the class tap from the class tap selector 42, and provides the ADRC class to the normalized student waveform adding-up unit 46. That is, the ADRC classification unit 43 performs the process of step S23 of FIG. 6.

The feature amount computation unit 44 computes the feature amount for each ADRC class, and provides the feature amount to the feature amount determination unit 45. For example, in terms of the above-described example, the inflection point position shown in Expression (15) above is computed as the feature amount, and this is provided to the feature amount determination unit 45. That is, the feature amount computation unit 44 performs the process of step S25 of FIG. 6.

The feature amount determination unit 45 determines the feature amount for each ADRC class. The normalized student waveform adding-up unit 46 adds up, for each ADRC class, the waveform of the student image signal (SD signal) that has been determined by the feature amount determination unit 45 to be the feature amount that should be added up. For example, in the above-described example, in the case that the inflection point position is determined to be 0.5, the waveform will be added up. That is, the feature amount determination unit 45 performs the process of step S26 of FIG. 6. Furthermore, the normalized student waveform adding-up unit 46 performs the process of step S27 of FIG. 6.

The averaging unit 47 averages, for each ADRC class, the processing results of the normalized student waveform adding-up unit 46, that is, the waveforms that have been added up, and outputs each of the resulting waveforms for each ADRC class as the reference waveform.

Figure 14:
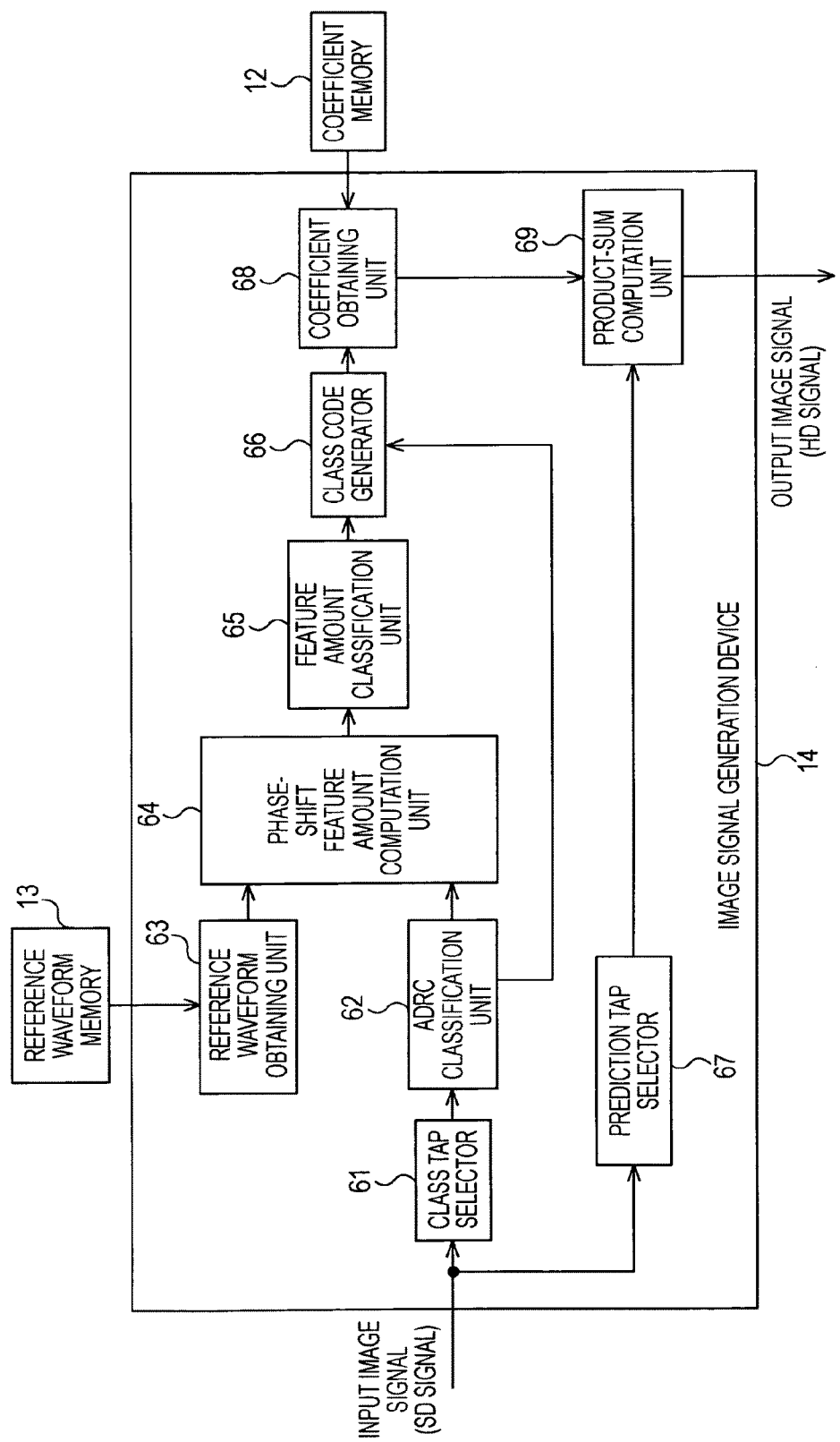
FIG. 14 is a block diagram showing an example of the functional configuration of an image signal generation device according to an embodiment of an information processing apparatus to which the present invention is applied.
Figure 15:
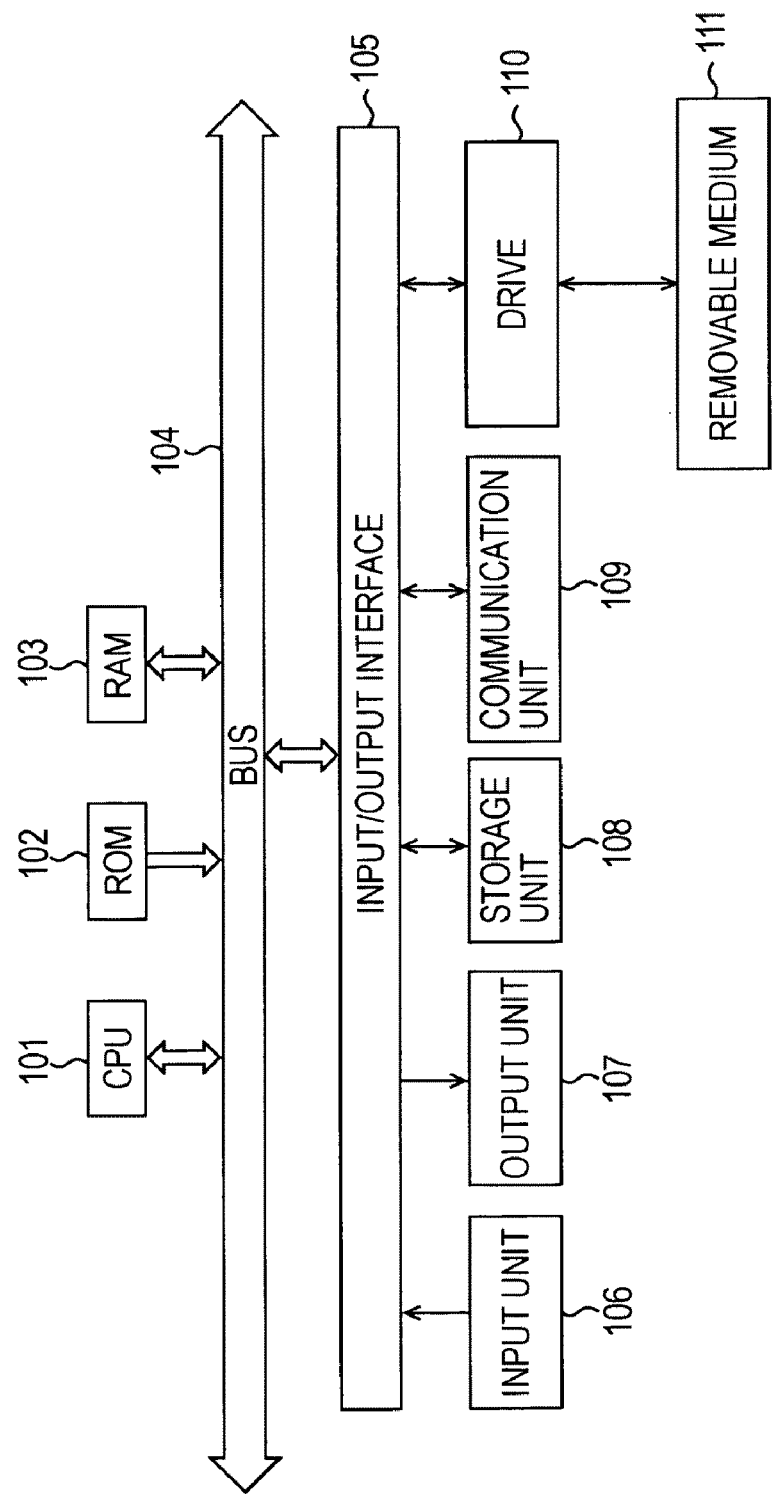
FIG. 15 is a block diagram showing an example of the configuration of a personal computer serving as an information processing apparatus to which an embodiment of the present invention is applied.

FIG. 14 is a function block diagram showing an example of the functional configuration of the image signal generation device 14.

It is possible for the image signal generation device 14 to perform the mapping process of FIG. 7.

The image signal generation device 14 includes a class tap selector 61, an ADRC classification unit 62, a reference waveform obtaining unit 63, a phase-shift feature amount computation unit 64, a feature amount classification unit 65, a class code generator 66, a prediction tap selector 67, a coefficient obtaining unit 68, and a product-sum computation unit 69.

An input image signal (SD signal) is input to the image signal generation device 14. More specifically, the input image signal (SD signal) is input to the class tap selector 61 and the prediction tap selector 67. That is, the process of step S41 of FIG. 7 is performed.

The class tap selector 61 selects a class tap from the input image signal (SD signal), and provides the class tap to the ADRC classification unit 62. That is, the class tap selector 61 performs the process of step S42 of FIG. 7.

The ADRC classification unit 62 generates an ADRC class by performing a 1-bit ADRC process by using a class tap from the class tap selector 61, and provides the ADRC class to the phase-shift feature amount computation unit 64 and the class code generator 66. That is, the ADRC classification unit 62 performs the process of step S43 of FIG. 7.

The reference waveform obtaining unit 63 obtains a reference waveform for each ADRC class from the reference waveform memory 13, and provides the reference waveform to the phase-shift feature amount computation unit 64. That is, the reference waveform obtaining unit 63 performs the process of step S44 of FIG. 7.

The phase-shift feature amount computation unit 64 generates a phase-shifted input waveform, obtains a correlation with the reference waveform, and provides the correlation, as the feature amount, to the feature amount classification unit 65. That is, as described above, as shown in, for example, FIG. 5, the phase-shift feature amount computation unit 64 determines a correlation by using the data for 5 pixels of each of the −7/8 phase-shifted input waveform to the 7/8 phase-shifted input waveform and the reference waveform determined in advance for each ADRC class. That is, since the −7/8 phase-shifted input waveform to the 7/8 phase-shifted input waveform is composed of 15 items of waveform data, 15 correlation coefficients are computed as the feature amount. As described above, the phase-shift feature amount computation unit 64 performs the process of step S45 of FIG. 7.

The feature amount classification unit 65 generates a feature amount class. More specifically, for example, in the case that the 15 correlation coefficients are provided as the feature amount, the feature amount classification unit 65 specifies a phase-shifted input waveform having a maximum value among the 15 correlation coefficients, generates a feature amount class on the basis of the shifted (offset) position of the specified phase-shifted input waveform, and provides the feature amount class to the class code generator 66. That is, the feature amount classification unit 65 performs the process of step S46 of FIG. 3.

The class code generator 66 generates the entire class code from the ADRC class and the feature amount class, and provides the class code to the coefficient obtaining unit 68. That is, the class code generator 66 performs the process of step S47 of the FIG. 3.

The prediction tap selector 67 selects a prediction tap from the input image signal (SD signal), and provides the prediction tap to the product-sum computation unit 69. The coefficient obtaining unit 68 obtains a prediction coefficient corresponding to the class code generated by the class code generator 66 from the coefficient memory 12, and provides the prediction coefficient to the product-sum computation unit 69. The product-sum computation unit 69 substitutes, in the prediction computation expression of Expression (1), the prediction coefficient from the coefficient obtaining unit 68 and each item of data on the prediction tap from the prediction tap selector 67, and product-sum computation is performed. As a result, an HD prediction image signal (HD signal) is generated from the input image signal (SD signal), and the HD prediction image signal is output as an output image signal.

In the above-described example, for classification performed in conjunction with feature amount classification, ADRC classification is adopted. However, the classification performed in conjunction with feature amount classification is not limited to ADRC classification, and classification of another technique, for example, classification by vector quantization (VQ), or the like can be adopted. In other words, in these classifications, since the feature amount at pixel accuracy is used, the classification accuracy is coarse, and therefore, the problems described in the section of the Summary of the Invention occur. That is, in the adaptive process of the related art, problems, such as the sense that there is insufficient resolution at the time of high density (zoom) conversion and ringing, occur. Accordingly, in the technique of the embodiment of the present invention, feature amount classification using the feature amount lower than or equal to the pixel accuracy is adopted so that classification in which classification accuracy is coarse is set as classification of a first selection and the classification of the first selection is further classified into small groups. That is, the feature amount classification may be said to be classification of a second selection.

As described above, in the technique of the embodiment of the present invention, since the classification of the second selection is performed after the first selection, it is possible to perform classification with accuracy higher than in the related art. As a result, the following first to third advantages can be obtained.

The first advantage is the advantage that it is possible to generate an image signal having a resolution (with a sharply rising signal edge) higher than that of the classification adaptive process of the related art.

The second advantage is the advantage that it is possible to generate a high-density (high-resolution (with a sharply rising signal edge) more than before during zoom) image signal.

The third advantage is the advantage that it is possible to generate an image signal in which ringing is reduced.

The above-described series of processes can be performed by hardware or software.

In this case, as at least parts of the above-described information processing apparatus, for example, the learning device 11 of FIG. 12 and the image signal generation device 14 of FIG. 14, for example, a personal computer shown in FIG. 16 may be adopted.

In FIG. 16, a CPU (Central Processing Unit) 101 executes various kinds of processing in accordance with programs recorded in a ROM (Read Only Memory) 102 or programs loaded from a storage unit 108 into a RAM (Random Access Memory) 103. In the RAM 103, furthermore, data necessary for the CPU 101 to execute various kinds of processing, and the like are stored as appropriate.

The CPU 101, the ROM 102, and the RAM 103 are interconnected with one another via a bus 104. An input/output interface 105 is also connected to the bus 104.

An input unit 106 including a keyboard, a mouse, and the like, an output unit 107 including a display panel or the like, a storage unit 108 including a hard disk or the like, and a communication unit 109 including a modem, a terminal adaptor, and the like are connected to the input/output interface 105. The communication unit 109 controls communication performed with other devices (not shown) via a network, including the Internet.

A drive 110 is also connected to the input/output interface 105 as necessary. A removable medium 111 formed of a magnetic disc, an optical disc, a magneto-optical disc, or a semiconductor memory is loaded thereinto as appropriate. A computer program read therefrom is installed into the storage unit 108 as necessary.

In a case where the series of processes is to be performed by software, a program constituting the software is installed from a recording medium into a computer built in dedicated hardware or, for example, a general-purpose personal computer capable of performing various functions by various programs being installed thereon.

As shown in FIG. 16, the recording medium containing such a program is constituted by a removal medium (packaged medium) 111 formed of a magnetic disk (including a flexible disk), an optical disk (including a compact disc read-only memory (CD-ROM), a digital versatile disc (DVD), or a magneto-optical disc (MD (Mini Disc)), or a semiconductor memory, in which programs are stored, the removal medium being distributed to provide programs to a user separately from the main unit of the apparatus. In addition, the recording medium is constituted by the ROM 102 and a hard disk, in which programs are recorded, the ROM 102 and the hard disk being provided to the user in a state in which they are pre-installed into the main unit of the apparatus.

Note that in this description, steps describing a program recorded on a recording medium include not only processing operations performed in time series in accordance with the written order but also processing operations performed in parallel or independently, the processing operations being not necessarily performed in time series.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   first classification means for setting each of pixels forming a first image as a pixel of interest and classifying the pixels of interest into one of a plurality of provided classes of a first type in accordance with a predetermined rule;
   feature amount generation means for generating a shifted waveform whose phase is shifted with respect to a waveform of the first image containing the pixels of interest and for generating a feature amount based on the shifted waveform for each of the plurality of classes of the first type;
   second classification means for classifying, on the basis of the feature amount generated by the feature amount generation means, the pixels of interest on which the classification of the first type has been performed into one of a plurality of provided classes of a second type in accordance with the feature amount for each of the plurality of classes of the first type; and
   prediction calculation means for predictively calculating pixels forming a second image by using a group of coefficients specified by each class of the pixels of interest of the first type and the second type and a group of data pixels including the pixels of interest.

2. The information processing apparatus according to claim 1, further comprising reference waveform generation means for generating a reference waveform for each of the plurality of classes of the first type,
   wherein the feature amount generation means generates the feature amount on the basis of a correlation between the reference waveform and the shifted waveform.

3. The information processing apparatus according to claim 2, wherein the waveform generation means determines an inflection point of the waveform of the first image containing the pixels of interest and generates, as the reference waveform, a waveform whose inflection point is located at a specific place.

4. The information processing apparatus according to claim 1, wherein the classes of the first type are classes that are classified using adaptive dynamic range coding.

5. An image processing method for use with an information processing apparatus, the image processing method comprising the steps of:
   setting each of pixels forming a first image as a pixel of interest and classifying the pixels of interest into one of a plurality of provided classes of a first type in accordance with a predetermined rule;

generating a shifted waveform whose phase is shifted with respect to a waveform of the first image containing the pixels of interest and generating a feature amount based on the shifted waveform for each of the plurality of classes of the first type;

classifying, on the basis of the generated feature amount, the pixels of interest on which the classification of the first type has been performed into one of a plurality of provided classes of a second type in accordance with the feature amount for each of the plurality of classes of the first type; and predictively calculating the pixels forming a second image by using a group of coefficients specified by each class of the pixels of interest of the first type and the second type and a group of data pixels including the pixels of interest.

6. A non-transitory computer-readable medium having stored thereon a computer-executable program comprising the steps of:

setting each of pixels forming a first image as a pixel of interest and classifying the pixels of interest into one of a plurality of provided classes of a first type in accordance with a predetermined rule;

generating a shifted waveform whose phase is shifted with respect to a waveform of the first image containing the pixels of interest and generating a feature amount based on the shifted waveform for each of the plurality of classes of the first type;

classifying, on the basis of the generated feature amount, the pixels of interest on which the classification of the first type has been performed into one of a plurality of provided classes of a second type in accordance with the feature amount for each of the plurality of classes of the first type; and predictively calculating the pixels forming a second image by using a group of coefficients specified by each class of the pixels of interest of the first type and the second type and a group of data pixels including the pixels of interest.

7. An information processing apparatus comprising:

student generation means for receiving a first image as a teacher and generating a second image as a student from the first image;

first classification means for setting each of pixels forming the second image as a pixel of interest and classifying the pixels of interest into one of a plurality of provided classes of a first type in accordance with a predetermined rule;

feature amount generation means for generating a shifted waveform whose phase is shifted with respect to a waveform of the second image containing the pixels of interest and for generating a feature amount based on the shifted waveform for each of the plurality of classes of the first type;

second classification means for classifying, on the basis of the feature amount generated by the feature amount generation means, the pixels of interest on which the classification of the first type has been performed into one of a plurality of provided classes of a second type in accordance with the feature amount for each of the plurality of classes of the first type; and coefficient generation means for generating a group of coefficients used to predictively calculate pixels forming the first image from a group of data pixels including the pixels of interest for each of the classes of a type specified from the first type and the second type.

8. The information processing apparatus according to claim 7, further comprising reference waveform generation means for generating a reference waveform for each of the plurality of classes of the first type, wherein the feature amount generation means generates the feature amount on the basis of a correlation between the reference waveform and the shifted waveform.

9. The information processing apparatus according to claim 8, wherein the waveform generation means determines an inflection point of the waveform of the first image containing the pixels of interest and generates, as the reference waveform, a waveform whose inflection point is located at a specific place.

10. The information processing apparatus according to claim 7, wherein the classes of the first type are classes that are classified using adaptive dynamic range coding.

11. An image processing method for use with an information processing apparatus, the image processing method comprising the steps of:

receiving a first image as a teacher and generating a second image as a student from the first image;

setting each of pixels forming the second image as a pixel of interest and classifying the pixels of interest into one of a plurality of provided classes of a first type in accordance with a predetermined rule;

generating a shifted waveform whose phase is shifted with respect to a waveform of the second image containing the pixels of interest and generating a feature amount based on the shifted waveform for each of the plurality of classes of the first type;

classifying, on the basis of the generated feature amount, the pixels of interest on which the classification of the first type has been performed into one of a plurality of provided classes of a second type in accordance with the feature amount for each of the plurality of classes of the first type; and generating a group of coefficients used to predictively calculate pixels forming the first image from a group of data pixels including the pixels of interest for each of the classes of a type specified from the first type and the second type.

12. A non-transitory computer-readable medium having stored thereon a computer-executable program comprising the steps of:

receiving a first image as a teacher and generating a second image as a student from the first image;

setting each of pixels forming the second image as a pixel of interest and classifying the pixels of interest into one of a plurality of provided classes of a first type in accordance with a predetermined rule;

generating a shifted waveform whose phase is shifted with respect to a waveform of the second image containing the pixels of interest and generating a feature amount based on the shifted waveform for each of the plurality of classes of the first type;

classifying, on the basis of the generated feature amount, the pixels of interest on which the classification of the first type has been performed into one of a plurality of provided classes of a second type in accordance with the feature amount for each of the plurality of classes of the first type; and generating a group of coefficients used to predictively calculate pixels forming the first image from a group of data pixels including the pixels of interest for each of the classes of a type specified from the first type and the second type.

13. An information processing apparatus comprising:
a first classification unit configured to set each of pixels forming a first image as a pixel of interest and classify the pixels of interest into one of a plurality of provided classes of a first type in accordance with a predetermined rule;
a feature amount generation unit configured to generate a shifted waveform whose phase is shifted with respect to a waveform of the first image containing the pixels of interest and configured to generate a feature amount based on the shifted waveform for each of the plurality of classes of the first type;
a second classification unit configured to classify, on the basis of the feature amount generated by the feature amount generation means, the pixels of interest on which the classification of the first type has been performed into one of a plurality of classes of a second type in accordance with the feature amount for each of the plurality of classes of the first type; and
a prediction calculation unit configured to predictively calculate pixels forming a second image by using a group of coefficients specified by each class of the pixels of interest of the first type and the second type and a group of data pixels including the pixels of interest.

14. An information processing apparatus comprising:
a student generation unit configured to receive a first image as a teacher and generating a second image as a student from the first image;
a first classification unit configured to set each of pixels forming the second image as a pixel of interest and classifying the pixels of interest into one of a plurality of provided classes of a first type in accordance with a predetermined rule;
a feature amount generation unit configured to generate a shifted waveform whose phase is shifted with respect to a waveform of the second image containing the pixels of interest and for generating a feature amount based on the shifted waveform for each of the plurality of classes of the first type;
a second classification unit configured to classify, on the basis of the feature amount generated by the feature amount generation means, the pixels of interest on which the classification of the first type has been performed into one of a plurality of classes of a second type in accordance with the feature amount for each of the plurality of classes of the first type; and
a coefficient generation unit configured to generate a group of coefficients used to predictively calculate pixels forming the first image from a group of data pixels including the pixels of interest for each of the classes of a type specified from the first type and the second type.

* * * * *